United States Patent [19]

Hawkins et al.

[11] 4,072,138
[45] Feb. 7, 1978

[54] FUEL SYSTEM

[75] Inventors: Clyde C. Hawkins, Greensboro; Jesse R. Hawkins, Pleasant Garden, both of N.C.

[73] Assignee: Hawkins Enterprises, Inc., Greensboro, N.C.

[21] Appl. No.: 707,804

[22] Filed: July 22, 1976

[51] Int. Cl.² .......................................... F02M 31/00
[52] U.S. Cl. .............................. 123/122 E; 123/133; 123/122 H
[58] Field of Search ............... 123/122 E, 133, 122 H, 123/122 R; 261/144, 145

[56] References Cited

U.S. PATENT DOCUMENTS

| | | | |
|---|---|---|---|
| 1,318,068 | 10/1919 | Giesler | 123/122 E |
| 3,354,872 | 11/1967 | Gratzmuller | 123/122 E |
| 3,783,841 | 1/1974 | Hirschler | 123/122 E |
| 3,913,543 | 10/1975 | Henri | 123/122 E |
| 3,951,124 | 4/1976 | Fairbanks | 123/122 E |
| 3,986,486 | 10/1976 | Rabbiosi | 123/122 E |
| 3,989,019 | 11/1976 | Brandt | 123/122 E |

*Primary Examiner*—Ronald H. Lazarus
*Attorney, Agent, or Firm*—Joseph H. Heard

[57] ABSTRACT

The fuel system services the internal combustion engine of an automobile or similar vehicle and includes a fuel heater disposed intermediate the carburator and fuel pump of the system. Fuel passing through the heater is heated to a desired temperature, by heat derived from a counter-flow circulation through the heater of hot water from the engine's cooling system, effective to increase the efficiency of the engine and to reduce exhaust-pollution. Operation of the heater is automatically and continuously regulated by control means which detects and is responsive to the temperature of the fuel passing downstream from the heater to the carburator. Cooling means are provided within that part of the fuel system intermediate the heater and the fuel pump to minimize heat-transfer in an upstream direction through the system, and to thus minimize the possibility of "vapor-lock" of the fuel pump. The fuel heater is of a compact, sealed construction facilitating economy of manufacture and installation, as well as safety of operation.

11 Claims, 2 Drawing Figures

FUEL SYSTEM

BACKGROUND OF THE INVENTION

This invention relates to fuel systems for the internal combustion engines of automobiles or similar vehicles. and more particularly relates to fuel systems of the type which attempt to achieve increased operating efficiency and/or reduced exhaust-pollution, from the engines serviced thereby, by heating of the fuel conducted to such engines.

Prior patents disclosing fuel systems of the aforesaid general type, which incorporate fuel heating means therein, include the following: U.S. Pat. Nos. 3,807,377, 3,780,714, 3,797,468, 3,472,214, 3,286,703, 2,974,656, 2,748,758 and 2,179,235.

If a fuel system of the type in question is to operate in a safe and satisfatory manner, the heated fuel (usually gasoline) delivered thereby to the engine serviced by the system must be maintained within a relatively limited temperature range. The optimum fuel temperature will vary in accordance with the characteristics of the engine, carburetor and the like of the particular automobile or similar vehicle in association with which the fuel system is employed. Therefore, while a fuel system incorporating a non-adjustable fuel heater may perform satisfactorily in one particular vehicle, the performance of the same fuel system in another vehicle may be totally inadequate and even detrimental or dangerous. It is also important, even in connection with a fuel system adapted for use in only one particular vehicle, that the heat output of the fuel heater be automatically regulated and varied in such a manner as to maintain the heated fuel at its optimum temperature irrespective of changes in the operating conditions of the vehicle. In the absence of adequate automatic regulation of the heat output of the fuel heater, a fuel system which performs satisfactorily when the vehicle is cruising will likely severely overheat the fuel when such vehicle is coasting or is stationary. Conversely, a system which performs satisfactorily when the vehicle is coasting or stationary will inadequately heat the fuel delivered to the carburetor when the vehicle is cruising unless at such time the heat output of the fuel heater is increased to accommodate the increased fuel flow. The same problem, — i.e., that of the fuel entering the carburetor being at a temperature less than the desired optimum one — will also arise if the fuel is heated to only its ultimate optimum temperature at the heater and is then allowed to undergo significant cooling during its thereafter ensuing passage from the heater to the carburetor. Detection and regulation of the temperature of the fuel are for the most part meaningless functions unless the desired end-result, which is maintenance of an optimum fuel-temperature at a location closely adjacent the carburetor of the system, is realized thereby.

Another major problem that has heretofore been encountered is that of "vapor lock" of the fuel pump components of fuel systems incorporating fuel heaters. Such problem is a serious one since as long as a "vapor lock" condition persists, the vehicle is virtually useless. Whatever benefits it might otherwise possess or yield, therefore, a fuel system which is subject to "vapor lock" of its fuel pump is not satisfactory and will not enjoy public acceptance.

A fuel system of the type in question should also be economical to manufacture, install and maintain. From the installation viewpoint, it is highly desirable that the system be readily installable within not only new vehicles, but also within existing vehicles of the many different makes and models presently in use. This requires that the system be capable of utilizing, with little and preferably no modifications thereto, the existing carburetor, fuel pump and other major fuel-handling components of the vehicle at hand. It also requires that the fuel heater component of the system be of a sufficiently compact size and versatile design as to be mountable and usable in whatever location and limited space as might be available in the engine comparts of different vehicles.

Lastly, a system of the type in question should for reasons of safety be of a durable "closed" construction not susceptible to fuel leakage and not requiring the accumulation of large quantities of fuel within any components located inside of the engine compartment of a vehicle.

SUMMARY OF THE INVENTION

The present invention provides an improved fuel system of the hereinbefore noted type which possesses the desirable attributes and is free from the deficiencies discussed above. The improved system may be installed with facility in virtually any vehicle, utilizing the existing carburetor and fuel pump present in such vehicle, and includes fuel heating means interposed between the fuel pump and the carburetor for heating fuel conducted therethrough during its passage from the pump to the carburetor. Adjustable control means automatically regulates the operation of the fuel heating means in accordance with the temperature of the fuel passing downstream therefrom to the carburetor. To minimize heat-transfer to and possible "vapor-lock" of the fuel pump, cooling means are provided within that part of the system intermediate the fuel heater and the fuel pump. The system is durable, safe and inexpensive, and is highly effective in significantly increasing the efficiency and reducing the exhaust pollution of a vehicle engine.

DESCRIPTION OF THE DRAWINGS

Still other features and benefits of the invention will be apparent from the following description of an illustrative embodiment thereof, which should be read in conjunction with the accompanying drawing, in which.

DESCRIPTION OF THE PREFERRED EMBODIMENT

Figure 1:
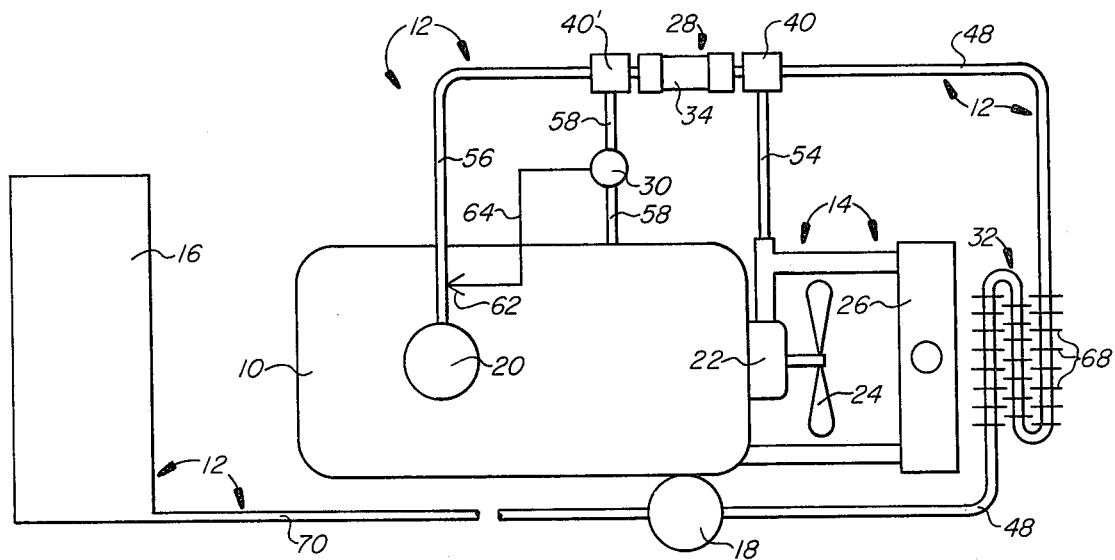
FIG. 1 is a schematic view of a fuel system in accordance with the invention, in association with the internal combustion engine and other components of an automobile or similar vehicle.

Referring first to FIG. 1 of the drawing, the numeral 10 designates the internal combustion engine of an automobile or similar vehicle (not shown), which engine is serviced by a fuel system 12 and a cooling system 14. In addition to other components hereinafter described, fuel system 12 includes a fuel reservoir or tank 16, a fuel pump 18 and a carburetor 20. Tank 16, pump 18 and carburetor 20 may be and illustratively are of conventional construction, and in the present system 12 perform their standard functions of supplying desired quantities of fuel, usually gasoline, to engine 10 during operation thereof. Engine-cooling system 14 also may be and illustratively is comprised of standard and well-known components, including a water pump 22, fan 24 and radiator 26 disposed forwardly of engine 10 and suitably connected thereto such that during operation of the engine, cool water (which may of course be in solution with anti-freeze or other additives) is circulated from radiator 26 to and through the water jacket (not shown) of engine 10, as a consequence of which the water becomes heated, and then is circulated back to and through radiator 26 for cooling by air currents passed forwardly to rearwardly (from right to left as viewed in FIG. 1) through such radiator. The aforesaid air currents are of course generated at all times during operation of engine 10 by the fan 24 driven thereby, and are supplemented by those resulting from motion of the vehicle (not shown) driven by engine 10 when such vehicle is moving in a forward direction.

In accordance with the present invention, fuel system 12 further includes fuel heating means 28 interposed intermediate fuel pump 18 and carburator 20 for heating the fuel during its passage from pump 18 to carburator 20; control means, including an adjustable and automatic valve member 30, and an associated temperature-detecting element 62, for regulating the operation of fuel heater 28 in accordance with the temperature of the fuel passing downstream from it to carburator 20; and cooling means 32 disposed within that part of system 12 intermediate fuel heater 28 and fuel pump 18 for minimizing heat-transfer in an "upstream" direction through the system from heater 28 to pump 18.

Figure 2:
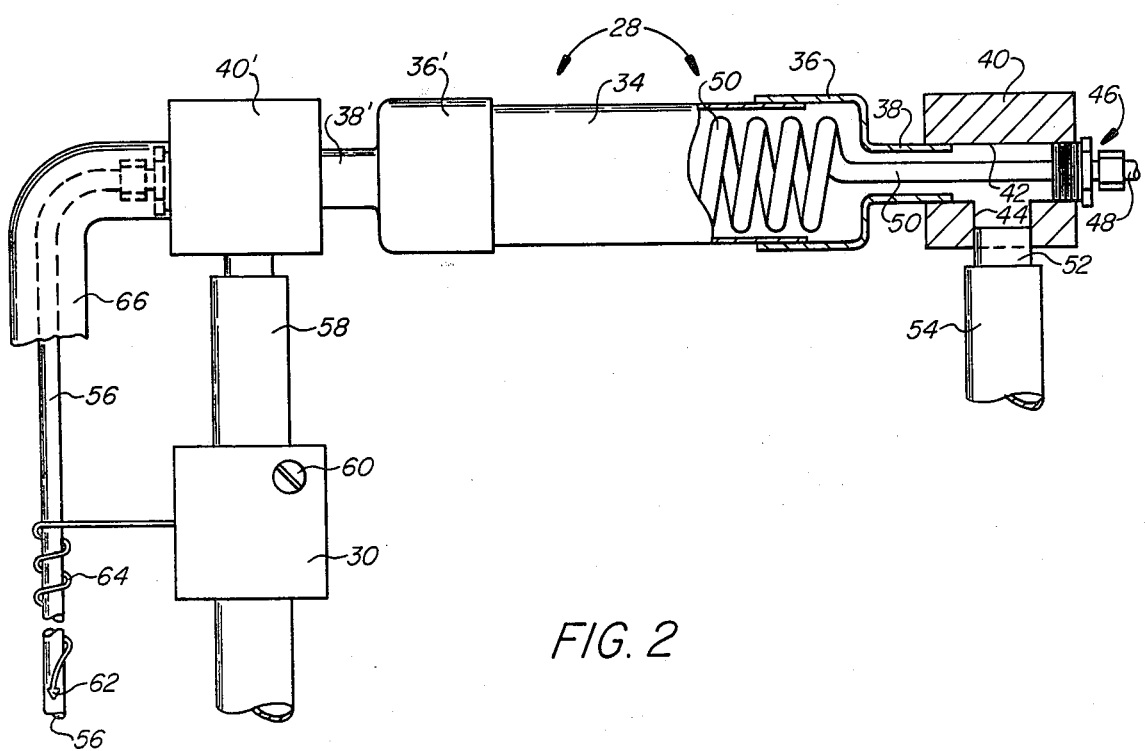
FIG. 2 is an enlarged elevational view, partially broken away to better disclose details of construction, of the fuel heater and immediately adjacent components of the system of FIG. 1.

Referring now also to FIG. 2, fuel heater 28 comprises a generally cylindrical casing 34 to the opposite ends of which are welded or otherwise permanently secured identical end members 36,36' having central tubular projections 38,38' respectively formed integrally therewith and projecting axially outwardly therefrom. The foregoing components are preferably formed of brass or similar material which is rigid and durable, and which constitutes a relatively good conductor of heat. A pair of identical mounting blocks 40,40', which preferably are also formed of metallic material, are respectively disposed adjacent projections 38,38' of end members 36,36'. Mounting block 40 has a central bore 42 extending through and between opposed faces thereof, which bore communicates intermediate its length with a second bore 44 extending inwardly through another face of block 40. Projection 38 of end member 36 is received within one end of central bore 42 of mounting block 40, and is welded or otherwise suitably secured thereto. Adjacent the opposite end of central bore 42 of block 40, suitable fittings 46 connect a conduit 48, leading from fuel pump 18, to a conduit 50 which extends axially through bore 42 and projection 38 and which within casing 34 is provided with a plurality of helical coils which are concentric with the axis of the casing and are in spaced adjacent relationship to its cylindrical inner surface. Conduit 50 is formed of heat-conductive and corrosion-resistant metallic material, such as copper tubing, and conduit 48 normally would be formed of the same type of material. The second bore 44 within mounting block 40 is connected, as by a fitting 52 and a rubber hose or other suitable conduit 54, to the "suction" or low-pressure side of the engine-cooling water-circulating system 14 associated with engine 10. The place of connection of conduit 54 to system 14 is adjacent a location where water pump 22 produces a maximum suction force.

The mounting block 40' adjacent the opposite end of heater 28 is provided with bores and fittings identical to those described in connection with mounting block 40, and is connected to projection 38' of end member 36' in the same manner as projection 38 is connected to mounting block 40. The "outlet" or left-most end portion of conduit 50 projects axially and freely through projection 38' and the central bore (not shown) of mounting block 40', and communicates with a copper-tubing conduit 56 extending to carburator 20. The second bore (not shown) of block 40' is connected as by a rubber hose or similar conduit 58, within which valve member 30 is interposed, to engine-cooling water-circulating system 14 at a location therein effective to cause hot water from such system to pass into and through block 40' when valve member 30 is in an open condition.

Valve 30 is of a commercially-available type effective to automatically vary the flow of hot water through conduit 58 in response to variations in temperature, outside of a desired range manually selectable by rotation of an adjustment screw 60 associated with the valve, sensed by a temperature-detecting bulb 62 connected to valve 30 by a capillary tube 64. Bulb 62 is disposed in engagement with the heat-conductive conduit 56 interconnecting fuel heater 28 and carburator 20, at a location along the length of such conduit closely adjacent carburator 20. A sheath of insulating material 66 encircles the entire length of conduit 56 and encloses, in addition to the conduit itself, bulb 62 and as much as possible of the capillary tube 64 interconnecting such bulb and valve 30. The primary function of the sheath of insulating material 66 is to so shield bulb 62 from air currents, radiated engine heat and the like as to insure that the temperature sensed by bulb 62 is that of the heated fuel passing through that part of conduit 56 closely adjacent carburator 20. A secondary function of the sheath of insulating material 66 is to minimize heat-loss from the fuel passing from heater 28 to carburator 20.

The cooling means 32 associated with the conduit 48 interconnecting fuel pump 18 and heater 28 illustratively comprises a sinuously-curved portion of such conduit which is disposed forwardly of radiator 26 in exposed relationship to the previously-mentioned air currents directed toward such radiator during operation of engine 10. At least the aforesaid sinuously-curved portion of conduit 50 is formed of copper tubing or similar metallic material constituting a good conductor and radiator of heat. To increase its heat-dissipating capacity, cooling means 32 may and illustratively does further include a plurality of heat-radiating fin elements 68 which are welded or otherwise suitably secured in encircling relationship to the aforesaid sinuously-curved portion of conduit 48. Although otherwise shown in FIG. 1 for convenience of illustration, the various parallel sections of the sinuously-curved portion of conduit 48 would of course normally not extend in their length direction in a common horizontal plane.

During operation of engine 10 hot water from engine-cooling system 14 is circulated through conduit 58 to mounting block 40', thence axially through heater 28 (from left to right as viewed in the drawing) to mounting block 40, and thence through conduit 54 back to system 14. At the same time gasoline or similar liquid fuel from fuel tank 16 passes through conduit 70 to fuel pump 18; thence through conduit 48 to mounting block 40; thence through the conduit 50 extending through block 40, heater 28 and block 40'; and finally through conduit 56 to carburator 20. In passing through heater 28 the fuel is heated to an extent dependent upon the then-existing magnitude of the counter-flow of hot water introduced into the heater through hose 58. The magnitude of such flow, and therefore the operation of heater 28, is regulated by valve 30 in accordance with the setting of adjustment screw 60 and the temperature of the fuel entering carburator 20, as detected by the bulb 62 disposed in engagement with that portion of conduit 56 closely adjacent the carburator. The optimum fuel temperature at the aforesaid location will usually be within the range of approximately 125°-135° F, but will vary depending upon the individual characteristics of the particular engine 10 serviced by fuel system 12. However, in any particular installation of fuel system 12 the optimum fuel temperature and setting of adjustment screw 60 can be readily determined by empirical means: i.e., by comparison of the increased efficiency of engine 10, as reflected by the miles-per-gallon fuel consumption of the vehicle driven by such engine, at different settings of adjustment screw 60. Once the optimum fuel temperature and setting of adjustment screw 60 are determined for a particular vehicle, further adjustments of screw 60 are not required and the operation of heater 28 is thereafter automatically and continuously regulated by valve 30 in response to the detection by bulb 62 of variations from the optimum temperature of the fuel passing to carburator 20. If the detected fuel temperature is too low, valve 30 opens to increase the flow of hot water through conduit 58 and heater 28. Conversely, if the detected temperature is too high, valve 30 closes to decrease, or to entirely stop, the flow of hot water through conduit 58 and heater 28. When a complete closure of valve 30 occurs, most if not all of the residual water within heater 28 is rapidly evacuated therefrom through conduit 54 and the heater rapidly cools, particularly when its major components are formed of uninsulated heat-conductive material, to ambient temperature. System 12 therefore does not permit an overheated fuel condition to exist long enough for any detrimental or dangerous consequences to ensue therefrom.

The provisions of cooling means 32 within conduit 48 obviates the possibility of such conduit and/or the fuel therewithin transferring such heat in an "upstream" direction to fuel pump 18 as to cause "vapor-lock" of the fuel pump. It should be noted that this highly desirable result is achieved without sacrificing the safety-benefits inherent in the use throughout system 12 of fuel conduits formed entirely of copper tubing or the like, as opposed to conduits formed of other materials.

Although heater 28 is shown in the drawing in a substantially horizontal orientation, its operation is equally satisfactory if not even superior when mounted, as by means of suitable fasteners (not shown) connected to blocks 40,40', in a vertical orientation. Additionally, heater 28 is of a compact size and need not be mounted at any particular location within the engine-compartment of a vehicle. For the foregoing reasons, in conjunction with the fact that fuel heater 28 can be used in association with a standard carburator and fuel pump, it will be appreciated that the present fuel system 12 can be readily installed in virtually any vehicle. It will also be apparent that then the fuel system will require little if any maintenance and will be exceedingly reliable and safe, as well as effective, in its operation.

While a preferred embodiment of the invention has been specifically shown and described, this was for purposes of illustration only, and not for purposes of limitation, the scope of the invention being in accordance with the following claims.

That which is claimed is:

1. In combination with a vehicle having an internal combustion engine; and a fuel system for supplying liquid fuel to said engine; said fuel system including a fuel tank, a carburator, and a fuel pump for directing fuel from said tank to said carburator; the improvement comprising:

fuel heating means interposed within said fuel system intermediate said fuel pump and said carburator for heating fuel conducted therethrough during its passage from said fuel pump to said carburator;

control means for regulating the operation of said fuel heating means in accordance with the temperature of the fuel passing downstream from said fuel heating means to said carburator;

and cooling means within that part of said fuel system intermediate said fuel heating means and said fuel pump for minimizing heat-transfer in an upstream direction through said system from said fuel heating means to said fuel pump.

2. Apparatus as in claim 1, wherein said vehicle includes an engine-cooling system for circulating water through said engine; and further including conduit means for conducting heated water from said engine-cooling system through said fuel heating means in heat-exchanging counterflow relationship to the fuel conducted through said fuel heating means.

3. Apparatus as in claim 2, wherein said control means includes adjustable and temperature-responsive valve means interposed in said conduit means for varying the flow of heated water conducted to said fuel-heating means in accordance with the temperature of the fuel passing from said fuel heating means to said carburator.

4. Apparatus as in claim 3, wherein said control means further includes a temperature-detecting device connected to said valve means; and wherein said fuel system includes a conduit interconnecting said fuel heating means and said carburator for conducting heated fuel from said heating means to said carburator, said conduit being formed of metallic heat-conductive material; a sheath of insulating material encircling said conduit along substantially its entire length; and said temperature-detecting device being disposed between said sheath of insulating material and said conduit.

5. Apparatus as in claim 1, wherein said engine-cooling system includes a water-radiator; a fan driven by said engine for causing air currents to pass to and through said radiator; and said cooling means including a conduit, formed of heat-conductive metal and forming part of said fuel system between said fuel pump and said heating means, disposed forwardly of said radiator in exposed relationship to the air currents passing to said radiator.

6. Apparatus as in claim 5, wherein said cooling means further includes a plurality of heat-conductive fin-like elements carried by said conduit.

7. Apparatus as in claim 1, wherein said fuel heating means includes a generally cylindrical casing; end members fixedly secured to opposite ends of said casing and having tubular projections extending outwardly therefrom in substantial alignment with the central axis of said casing; a fuel-conducting conduit extending through said casing and through said end members, the opposite end portions of said conduit extending generally co-axially of and through said tubular projections of respective ones of said end members in radially spaced relationship thereto, and the medial portion of said conduit defining a plurality of helical coils extending in radially spaced and generally co-axial relationship to said casing.

8. Apparatus as in claim 7, and further including mounting blocks secured to respective ones of said tubular projections of said end members and having water passages extending therethrough and communicating with the associated ones of said tubular projections of said end members.

9. Apparatus as in claim 8, wherein said vehicle includes an engine-cooling system for circulating water through said engine; and further including conduit means innerconnecting said passages of said mounting blocks and said engine-cooling system for circulating heated water from said engine-cooling system through said passages and through said fuel heating means.

10. Apparatus as in claim 9, wherein said control means includes adjustable and temperature-responsive valve means associated with said conduit means for varying the flow of the water circulated through said fuel heating means in response to detected variations in the temperature of the fuel passing to and immediately upstream from said carburator.

11. Apparatus as in claim 1, wherein said cooling means is disposed distal from said fuel heating means, and is exposed to currents of ambient air passing thereto during operation of said vehicle.

* * * * *